United States Patent
Zernikow et al.

(10) Patent No.: US 7,237,962 B2
(45) Date of Patent: Jul. 3, 2007

(54) PRESTRESSED BEARING FOR ELECTRICAL MACHINES

(75) Inventors: Maik Zernikow, Hildesheim (DE); Oliver Eckert, Remseck (DE); Ngoc-Thach Nguyen, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 10/525,943

(22) PCT Filed: Jul. 31, 2003

(86) PCT No.: PCT/DE03/02570

§ 371 (c)(1),
(2), (4) Date: Feb. 8, 2005

(87) PCT Pub. No.: WO2004/057729

PCT Pub. Date: Jul. 8, 2004

(65) Prior Publication Data

US 2005/0238274 A1    Oct. 27, 2005

(30) Foreign Application Priority Data

Dec. 19, 2002    (DE) ............................... 102 59 710

(51) Int. Cl.
*F16C 19/08* (2006.01)

(52) U.S. Cl. ........................................ 384/518

(58) Field of Classification Search ................ 384/518, 384/517, 563, 462, 484
See application file for complete search history.

(56) References Cited

U.S. PATENT DOCUMENTS

| | | |
|---|---|---|
| 4,896,239 A | 1/1990 | Chose |
| 5,128,574 A | 7/1992 | Koizumi et al. |
| 5,316,393 A | 5/1994 | Daugherty |
| 5,638,233 A | 6/1997 | Ishizuka |

FOREIGN PATENT DOCUMENTS

| | | |
|---|---|---|
| DE | 619583 | 10/1935 |
| DE | 1010146 | 6/1957 |
| DE | 1014638 | 8/1957 |
| DE | 1822167 | 11/1960 |
| EP | 0289135 | 11/1988 |
| EP | 1401087 | 9/2002 |

*Primary Examiner*—Lenard A. Footland
(74) *Attorney, Agent, or Firm*—Michael J. Striker

(57) ABSTRACT

The present invention relates to an electrical machine 1, in particular an electric motor, with a housing 2 and covers 3, 4 that close the housing 2 and contain bearings 7, 8 that rotatably support a rotor 5. According to the present invention, spring elements 7.3, 8.3 are provided that act upon at least one bearing shell 7.1, 7.2, 8.1, 8.2 each of bearings 7, 8 with a compression force acting in the axial direction, whereby the mounting of the bearing shell 7.1, 7.2, 8.1, 8.2 that is acted upon by one of the spring elements 7.3, 8.3 is configured as a sliding fit.

5 Claims, 5 Drawing Sheets

PRESTRESSED BEARING FOR ELECTRICAL MACHINES

TECHNICAL AREA

The present invention relates to an electrical machine, in particular an electric motor.

BACKGROUND INFORMATION

The rotatably supported parts of an electrical machine, such as the rotor of an electric motor, are typically supported in ball bearings. When the direction of rotation of the rotor changes, bearings of this type can produce noises that are disruptive and negatively affect comfort. The disruptive noises are produced because the balls in the ball bearing start to travel when the direction of rotation of the rotor changes and strike the other race shoulder of the bearing shell of the ball bearing. The noise is amplified further by the fact that rotor oscillations occur when the direction of rotation of the rotor changes, the rotor oscillations then being transferred to the housing of the electrical machine.

SUMMARY OF THE INVENTION

The present invention enables substantially play-free support of rotatably supported machine elements, such as the rotor of an electric motor. Since there is practically no play in the axial direction, rotor oscillations—which could cause disruptive noises to be produced—do not occur even when the direction of rotation and the axial force change. Due to the substantially constant orientation of the rotor relative to the bearings, the balls in the bearing are successfully prevented from traveling and striking the race shoulder of the bearing shell, even when the direction of the axial force on the rotor suddenly changes. As a result, disruptive noises are prevented. Furthermore, the present invention enables good emergency running properties of the motor, since the bearing shells are installed in the housing of the motor with a sliding fit. If a bearing jams, the bearing is still able to slide in the housing. Due to the bearing construction designed according to the present invention, a very even distribution of the load among the two bearings is obtained. This results in very even wear and, therefore, a very long service life. The components of the bearing are easy to manufacture and install, which allows the manufacturing costs to be noticeably reduced. Finally, the motor can also be removed easily, to perform wear-induced repairs, for example, without causing any damage.

BRIEF DESCRIPTION OF THE DRAWINGS

The present invention is described in greater detail below with reference to the drawing.

DESCRIPTION OF THE PREFERRED EMBODIMENTS

Figure 1:
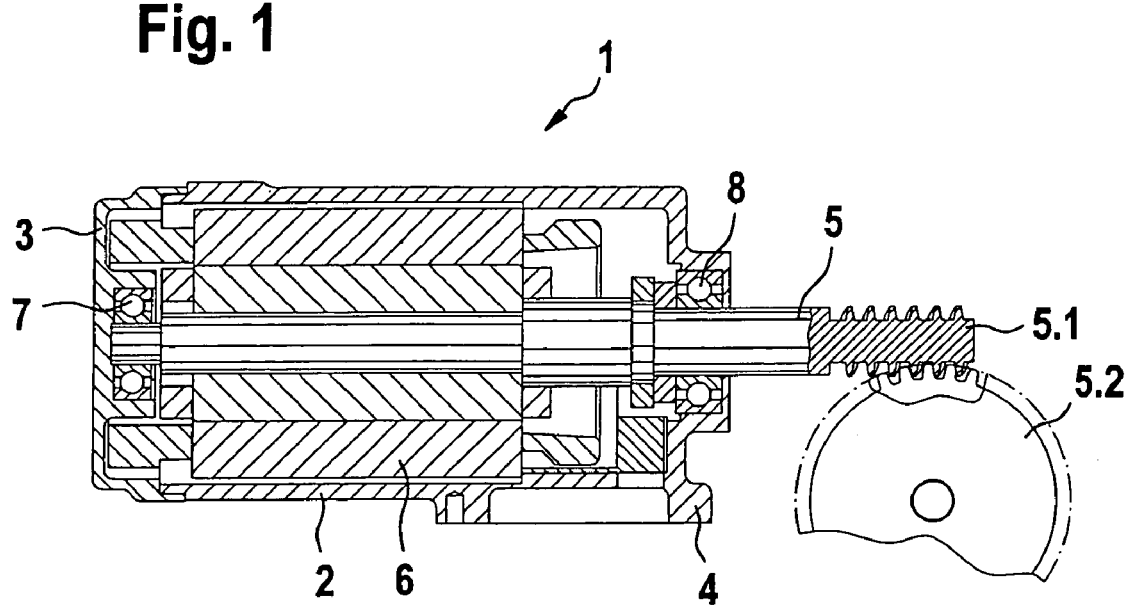
FIG. 1 shows an electrical machine, in particular an electric motor, in a longitudinal sectional view.

FIG. 1 shows an electrical machine 1, in particular an electric motor, in a longitudinal sectional view. A housing 2 that is closed by two covers 3, 4 encloses a stator 6 and a rotor 5. Rotor 5 is supported in two bearings, B bearing 7 and A bearing 8, both of which are ball bearings in particular. The endpiece of the shaft of rotor 5 extending out of housing 2 is configured as a worm 5.1 that meshes with a toothed wheel 5.2.

Figure 2:
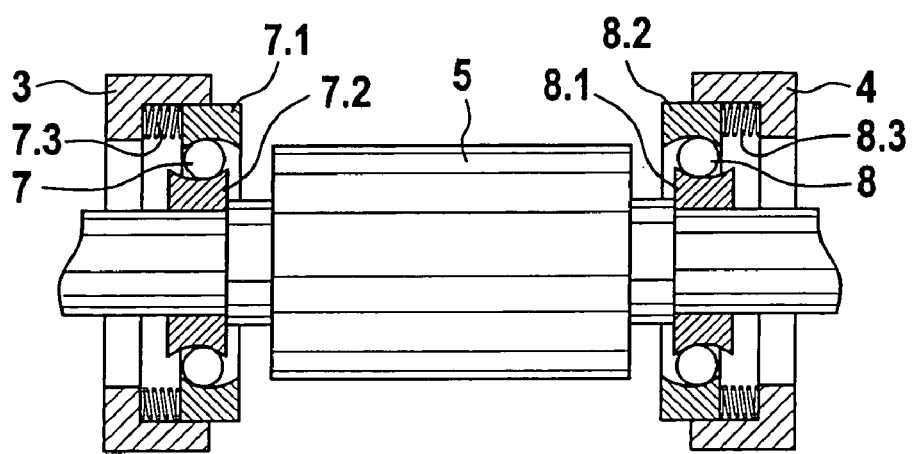
FIG. 2 shows the schematic illustration of a rotor supported in bearings in a first exemplary embodiment of the present invention.
Figure 3:
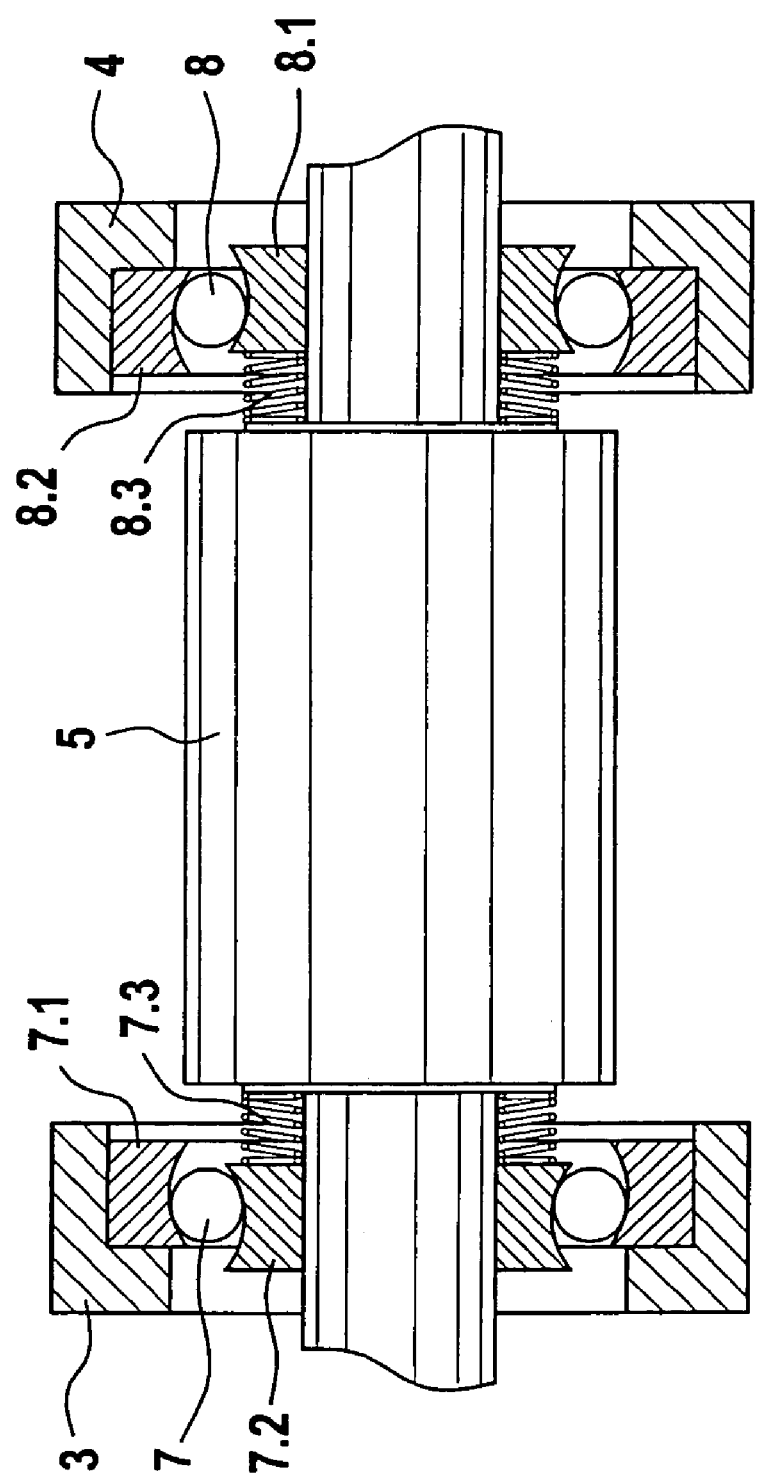
FIG. 3 shows the schematic illustration of a rotor supported in bearings in a second exemplary embodiment of the present invention.
Figure 4:
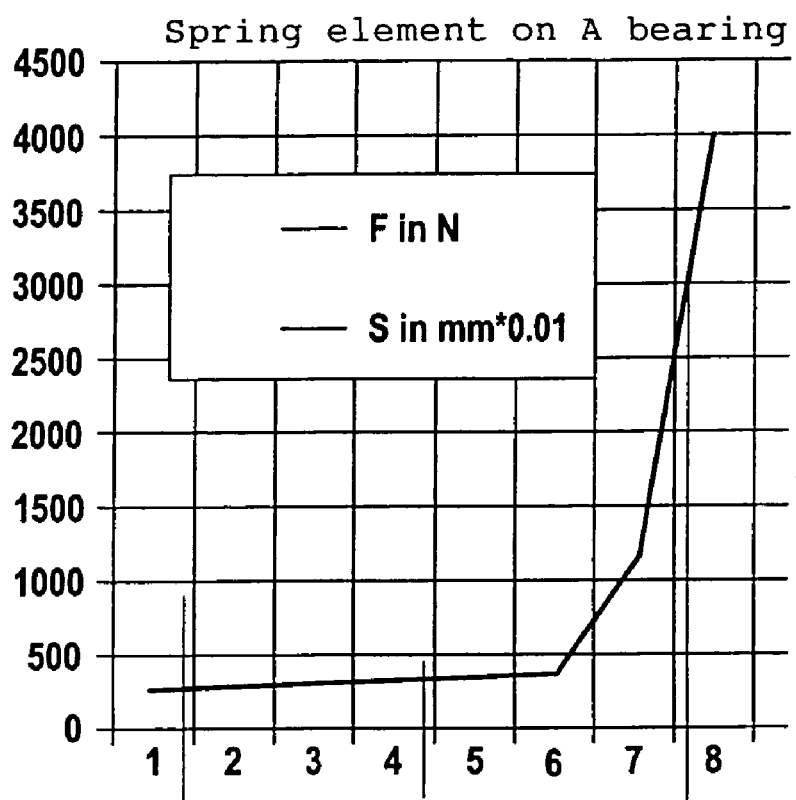
FIG. 4 shows a diagram of the spring force of a spring element of the A bearing as a function of deflection.
Figure 5:
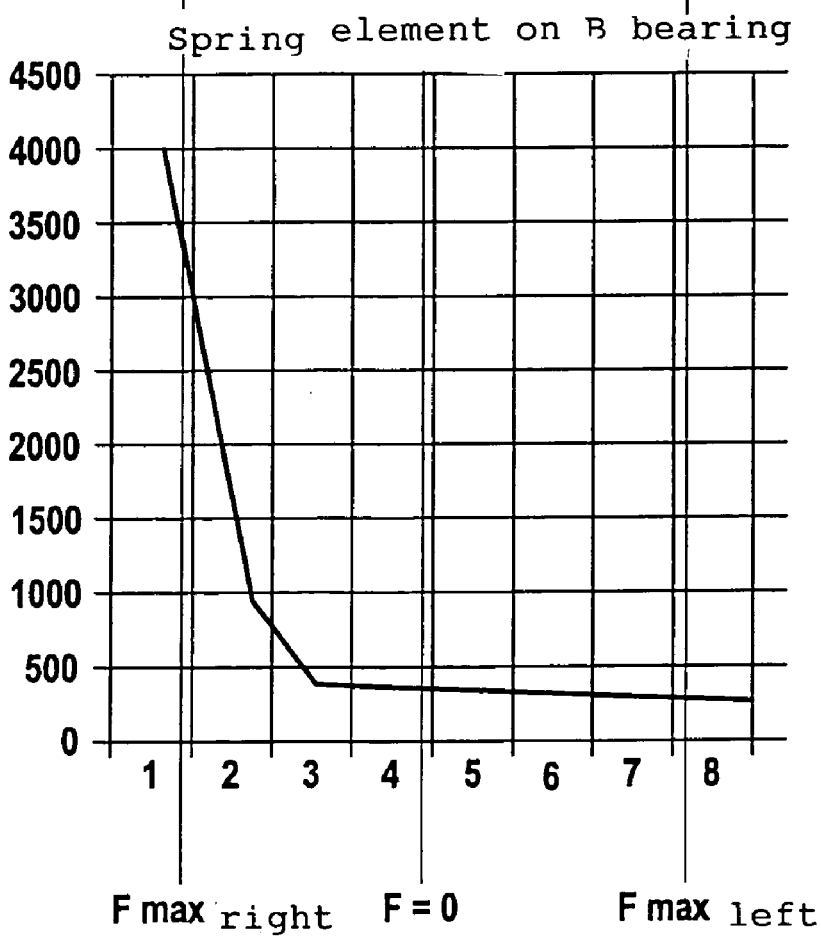
FIG. 5 shows a diagram of the spring force of a spring element of the B bearing as a function of deflection.

Further details of the bearing construction designed according to the present invention are shown in FIG. 2 and FIG. 3. FIG. 2 shows the schematic depiction of a rotor 5 supported in bearings 7, 8 in a first exemplary embodiment of the present invention. B lager 7 located in cover 3 is composed of an inner bearing shell 7.2 and an outer bearing shell 7.1. Inner bearing shell 7.2 is mounted on the shaft of rotor 5. Outer bearing shell 7.1 is mounted in cover 3 with a sliding fit. A spring element 7.3 is positioned between outer bearing shell 7.1 and cover 3, and bears against cover 3 and outer bearing shell 7.1. Spring element 7.3 exerts a force on outer bearing shell 7.1 that is directed inwardly in the axial direction. In the diagram in FIG. 5, the retractive force F of spring element 7.3 in newtons is plotted as a function of deflection s in hundredths of millimeters. The diagram shows that the strongest retractive force takes effect when rotor 5 is deflected in the axial direction to the left. Deflection of rotor 5 in the axial direction to the left is therefore counteracted, and rotor 5 is centered in the axial direction to the right. "A" bearing 8 is located in cover 4 on the right side of rotor 5. "A" bearing 8 includes a lower bearing shell 8.1 and an upper bearing shell 8.2. In turn, lower bearing shell 8.1 is mounted on the shaft of rotor 5. Upper bearing shell 8.2 of bearing 8 is supported in cover 4 with a sliding fit. A spring element 8.3 is located between cover 4 and outer bearing shell 8.2, the spring element bearing against cover 4 and outer bearing shell 8.2. Spring element 8.3 presses rotor 5 in the axial direction to the left. The diagram in FIG. 4 shows the retractive force F of spring element 8.3 in newtons as a function of deflection s in hundredths of millimeters. As shown in the diagram in FIG. 4, the retractive force F increases the more rotor 5 moves to the right. The mode of operation of the arrangement can be summarized with the following description. As soon as rotor 5 is deflected to the left, retractive force F of spring element 7.3 increases greatly and forces rotor 5 back to the right. Excessive deflection of rotor 5 to the right, in turn, is offset by the retractive force F of spring element 8.3. The overall result is that rotor 5 is forced to assume the most stable position of equilibrium possible between the two bearings 7 and 8. When axial oscillations of rotor 5 occur, in particular when the direction of rotation changes, spring elements 7.3 and 8.3 further cause balls 7.4 and 8.4 in ball bearings 7, 8 to bear, in a defined manner, against the shoulders of their races formed by the bearing shells. As a result, balls 7.4, 8.4 are prevented from traveling when the direction of rotation of rotor 5 changes, and the noises that would be otherwise produced are prevented.

Further advantageous emergency running properties result from the fact that outer bearing shells 7.1, 8.2 are mounted with a sliding fit. If one of the ball bearings 7, 8, or both bearings, become jammed, the sliding-fit arrangement allows outer bearing shells 7.1, 8.2 to continue to rotate, along with rotor 5, in their sliding-fit arrangement in covers 3, 4. The sliding fit arrangement further enables the electrical machine to be removed directly, to repair worn components, for example, without causing any damage.

A further exemplary embodiment of the present invention is shown in FIG. 3. The difference from the exemplary embodiment described previously with reference to FIG. 2 is that, in this case, inner bearing shells 7.2 and 8.2 are loaded by spring elements 7.3, 8.3. Furthermore, the seats of inner bearing shells 7.2 and 8.1 on the shaft of rotor 5 are configured as sliding fits that, in case of emergency, if bearings 7, 8 become jammed, allow emergency running operation. Spring elements 7.3, 8.3 bear against a step of rotor 5. A thorough description is not necessary, since the design is easy to understand. The advantages described with the first exemplary embodiment are also attainable with this exemplary embodiment.

Figure 6:
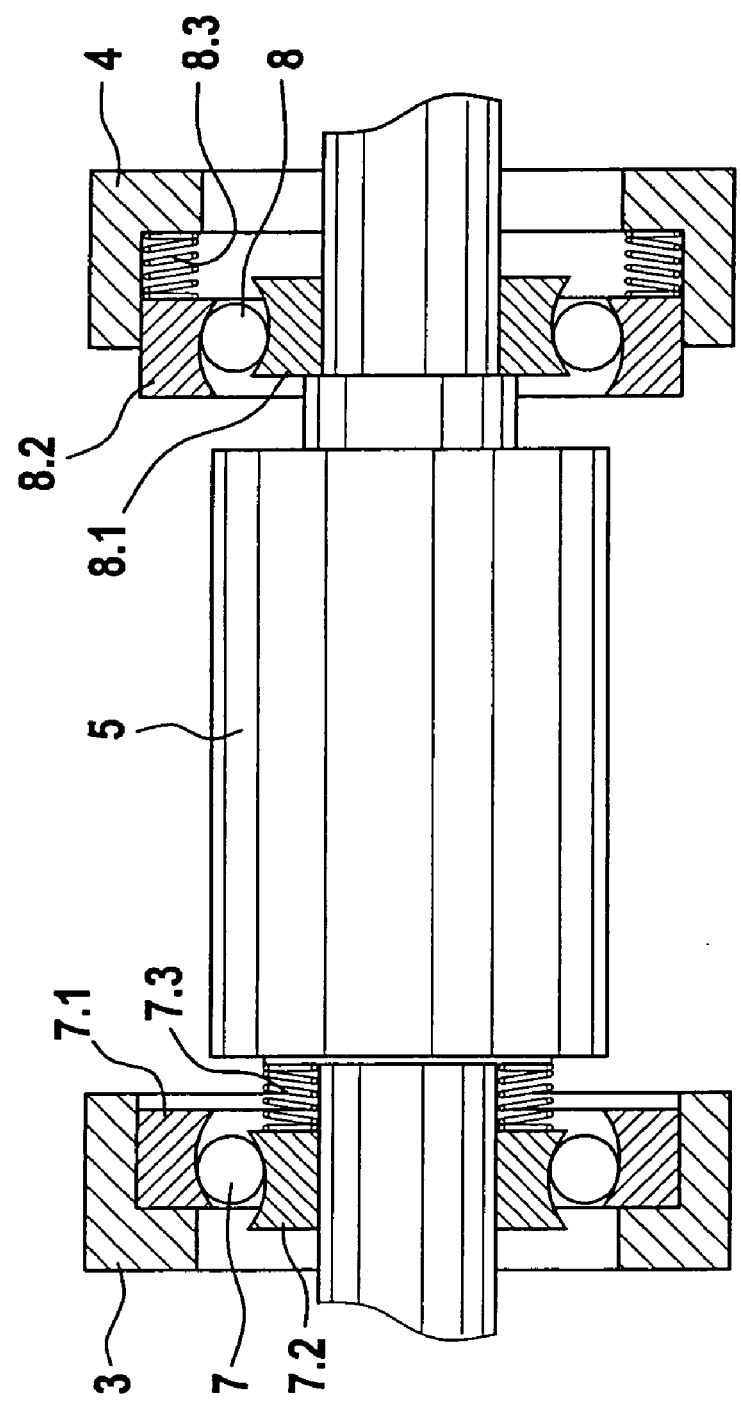
FIG. 6 shows a further exemplary embodiment of the present invention.

A further exemplary embodiment of the present invention is shown in FIG. 6. It shows that the design-related means of attaining the object of the invention for the first exemplary embodiments described can also be advantageously combined with each other. In this case, for example, with the B bearing, inner bearing shell 7.2 is loaded by spring element 7.3, while, with the A bearing, outer bearing shell 8.2 is loaded with spring element 8.3. The reverse combination is also possible, of course.

Figure 7:
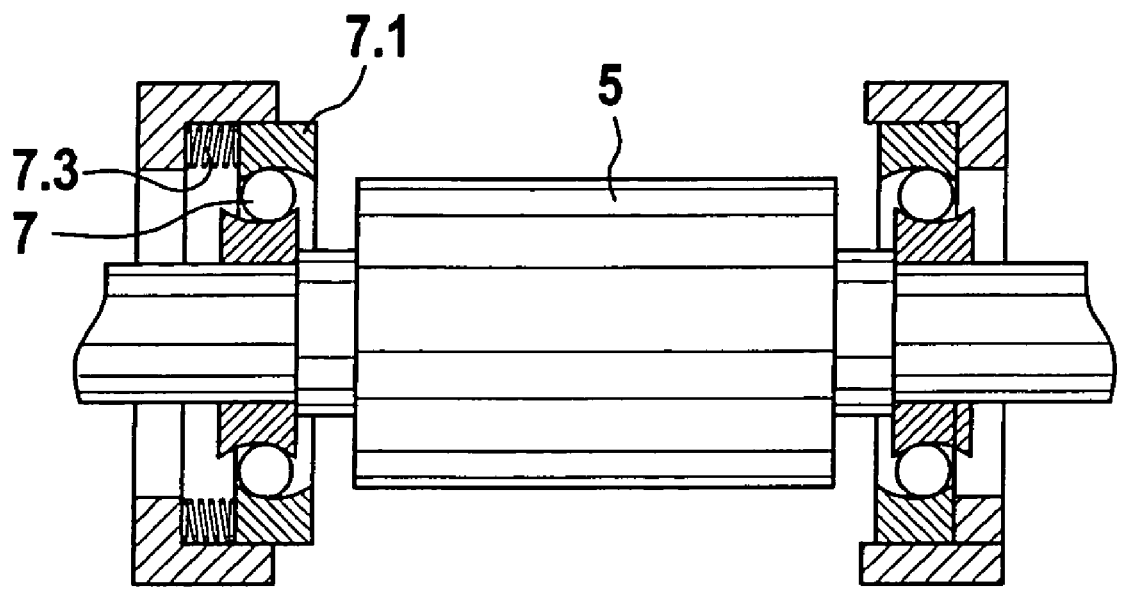
FIG. 7 shows a simplified exemplary embodiment of the present invention.

FIG. 7 shows a simplified exemplary embodiment of the present invention that can be realized in an economical manner. With this exemplary embodiment, a spring element 7.3 is provided on only one bearing side of rotor 5 and, in fact, on B bearing 7, the spring element applying pressure on outer bearing shell 7.1.

Figure 8:
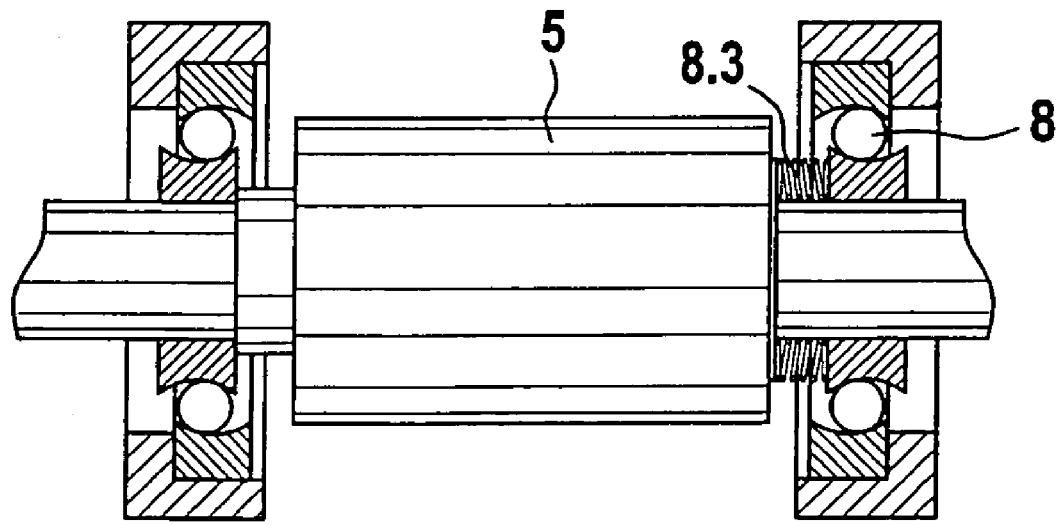
FIG. 8 shows a further simplified exemplary embodiment of the present invention.

With the further exemplary embodiment—which is also shown in a simplified depiction—according to FIG. 8, a spring element 8.3 is also provided on only one bearing side of rotor 5 and, in fact, on A bearing 8 in this case, the spring element applying pressure on inner bearing shell 8.2.

The means of attaining the object of the invention according to the present invention was described above in conjunction with an electrical machine, in particular an electric motor. It is also possible, however, to apply the means of attaining the object of the invention according to the present invention in any bearing design that requires suppression of axial play and, therefore, axial oscillations associated therewith.

| Reference Numerals | |
|---|---|
| 1 | Electrical machine |
| 2 | Housing |
| 3 | Cover |
| 4 | Cover |
| 5 | Rotor |
| 5.1 | Worm |
| 5.2 | Toothed wheel |
| 6 | Stator |
| 7 | B bearing |
| 7.1 | Outer bearing shell |
| 7.2 | Inner bearing shell |
| 7.3 | Spring element |
| 7.4 | Ball |
| 8 | A bearing |
| 8.1 | Inner bearing shell |
| 8.2 | Outer bearing shell |
| 8.3 | Spring element |
| 8.4 | Ball |
| F | Retractive force |

What is claimed is:

1. An electrical machine, with a housing (2) and covers (3, 4) that close the housing (2) and contain bearings (7, 8) that rotatably support a rotor (5), wherein, spring elements (7.3, 8.3) are provided that act upon at least one bearing shell (7.1, 7.2, 8.1, 8.2) each of bearings (7, 8) with a compression force acting in the axial direction, whereby the mounting of the bearing shell (7.1, 7.2, 8.1, 8.2) that is acted upon by one of the spring elements (7.3, 8.3) is configured as a sliding fit, and wherein one spring element (7.3, 8.3) each of the spring elements is located between the inner bearing shell (7.2, 8.1) and a step located on the shaft of the rotor (5).

2. The electrical machine as recited in claim 1, wherein the bearings (7, 8) are ball bearings.

3. The electrical machine as recited in claim 1, wherein the spring forces of the spring elements (7.3, 8.3) are directed toward each other such that the rotor (5) is stabilized in a central position between the bearings (7, 8).

4. The electrical machine as recited in claim 1, wherein the outer bearing shells (7.1, 8.2) of the bearing (7, 8) are mounted in the covers (3, 4), the inner bearing shells (7.2, 8.1) of the bearing (7, 8) are mounted on the shaft of the rotor (5) with a sliding fit, and the inner bearing shells (8.1, 7.2) of the bearing (7, 8) are acted upon by a spring element (7.3, 8.3) with pressure in the axial direction.

5. The electrical machine as recited in claim 1, wherein the retractive force (F) of the spring elements (7.3, 8.3) at a distance of s=150times 0.01 cm is between 2500 and 4000 newtons.

* * * * *